(12) United States Patent
Kim

(10) Patent No.: US 9,514,008 B2
(45) Date of Patent: Dec. 6, 2016

(54) SYSTEM AND METHOD FOR DISTRIBUTED PROCESSING OF FILE VOLUME

(75) Inventor: Tae Woong Kim, Seongnam-si (KR)

(73) Assignee: Naver Corporation, Gyeonggi-Do (KR)

( * ) Notice: Subject to any disclaimer, the term of this patent is extended or adjusted under 35 U.S.C. 154(b) by 548 days.

(21) Appl. No.: 13/244,417

(22) Filed: Sep. 24, 2011

(65) Prior Publication Data

US 2012/0078844 A1    Mar. 29, 2012

(30) Foreign Application Priority Data

Sep. 29, 2010 (KR) ......................... 10-2010-0094485

(51) Int. Cl.
*G06F 7/00* (2006.01)
*G06F 11/16* (2006.01)
*G06F 17/30* (2006.01)
*G06F 11/20* (2006.01)

(52) U.S. Cl.
CPC ....... *G06F 11/1662* (2013.01); *G06F 11/2048* (2013.01); *G06F 17/30215* (2013.01); *G06F 11/2035* (2013.01)

(58) Field of Classification Search
None
See application file for complete search history.

(56) References Cited

U.S. PATENT DOCUMENTS

| | | | |
|---|---|---|---|
| 7,913,056 B2 * | 3/2011 | Brown et al. | 711/203 |
| 8,140,637 B2 * | 3/2012 | Slater | G06F 11/1451 709/213 |
| 2006/0218435 A1 * | 9/2006 | van Ingen et al. | 714/6 |
| 2007/0220197 A1 | 9/2007 | Lasser | |
| 2008/0133561 A1 | 6/2008 | Dubnicki | |
| 2010/0153415 A1 * | 6/2010 | Muntz | 707/758 |
| 2011/0029730 A1 * | 2/2011 | Durocher et al. | 711/114 |
| 2011/0125797 A1 * | 5/2011 | Nasre et al. | 707/781 |
| 2011/0153570 A1 * | 6/2011 | Kim | 707/652 |

(Continued)

FOREIGN PATENT DOCUMENTS

| | | |
|---|---|---|
| JP | 2003058408 A | 2/2003 |
| JP | 2008-204206 A | 9/2008 |

(Continued)

OTHER PUBLICATIONS

Japanese Office Action dated Sep. 29, 2015 in corresponding JP Application No. 2011-212336.

(Continued)

*Primary Examiner* — Thu Nga Nguyen
(74) *Attorney, Agent, or Firm* — Harness, Dickey & Pierce, P.L.C.

(57) ABSTRACT

A file processing system includes a system targeting unit to target a distributed file system, a chunk generator to generate a chunk including file blocks and to generate copies of the chunk to be stored in the distributed file system, a data storage medium to store the chunk, and a chunk operation requesting unit to request storage of the generated chunk copies in the distributed file system. A distributed file system includes a first data server and a second data server. Each data server includes a chunk storage unit to store a chunk copy received from a file processing system, and a chunk operation performing unit to generate an identical copy of the stored chunk copy that is undamaged to replace a damaged chunk copy.

15 Claims, 7 Drawing Sheets

(56) References Cited

U.S. PATENT DOCUMENTS

2011/0208994 A1* 8/2011 Chambliss et al. .......... 714/6.24
2011/0276549 A1* 11/2011 Fathalla ....................... 707/704

FOREIGN PATENT DOCUMENTS

| JP | 2010044789 A | 2/2010 |
|----|---------------|--------|
| KR | 10-2009-0059859 | 6/2009 |
| KR | 10-2011-0070659 | 6/2009 |
| KR | 10-2010-0073154 | 7/2010 |
| WO | WO-2009084314 A1 | 7/2009 |

OTHER PUBLICATIONS

Japanese Office Action issued on May 31, 2016 for corresponding Japanese Patent Application No. 2011-212336.

\* cited by examiner

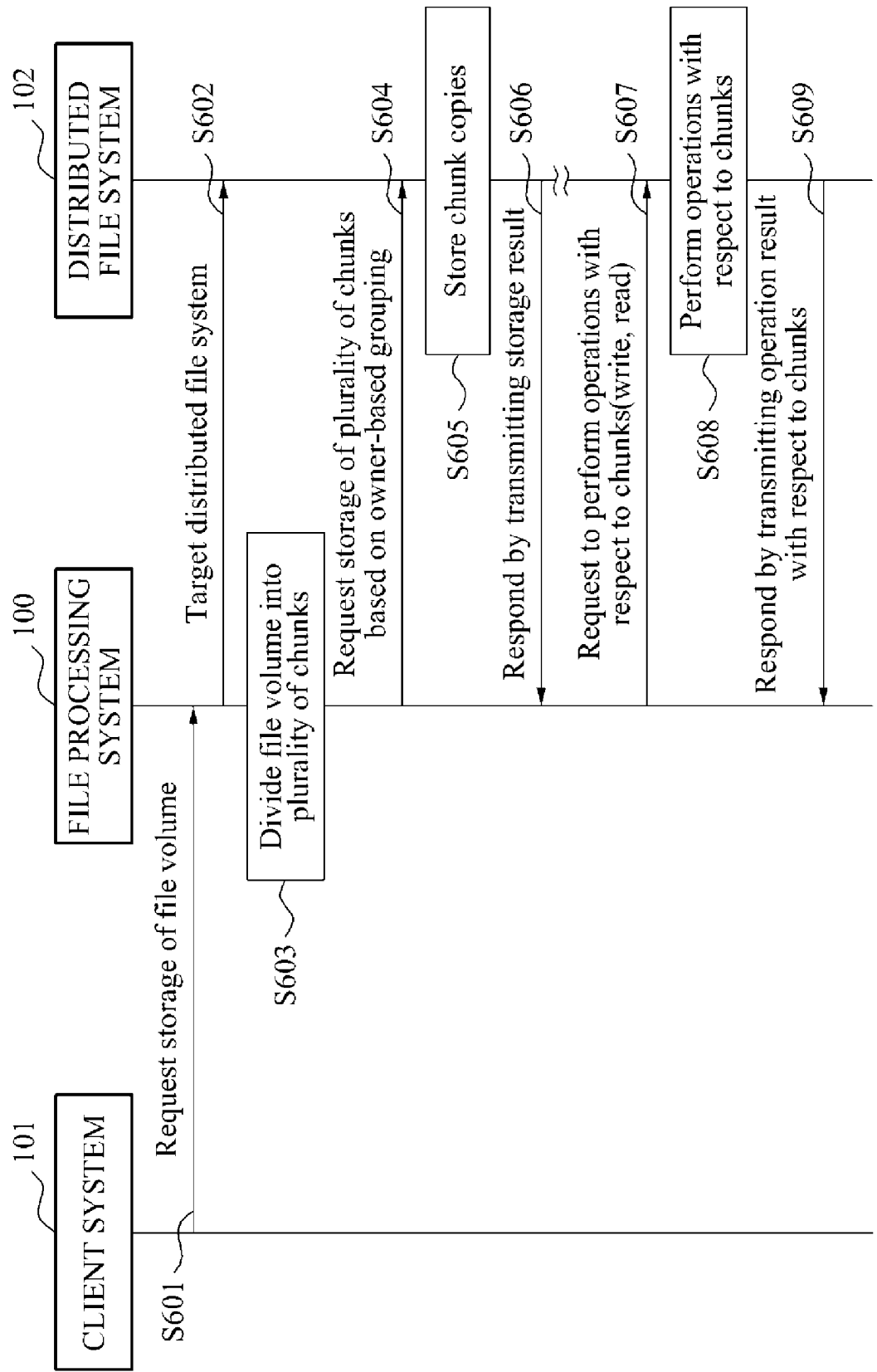

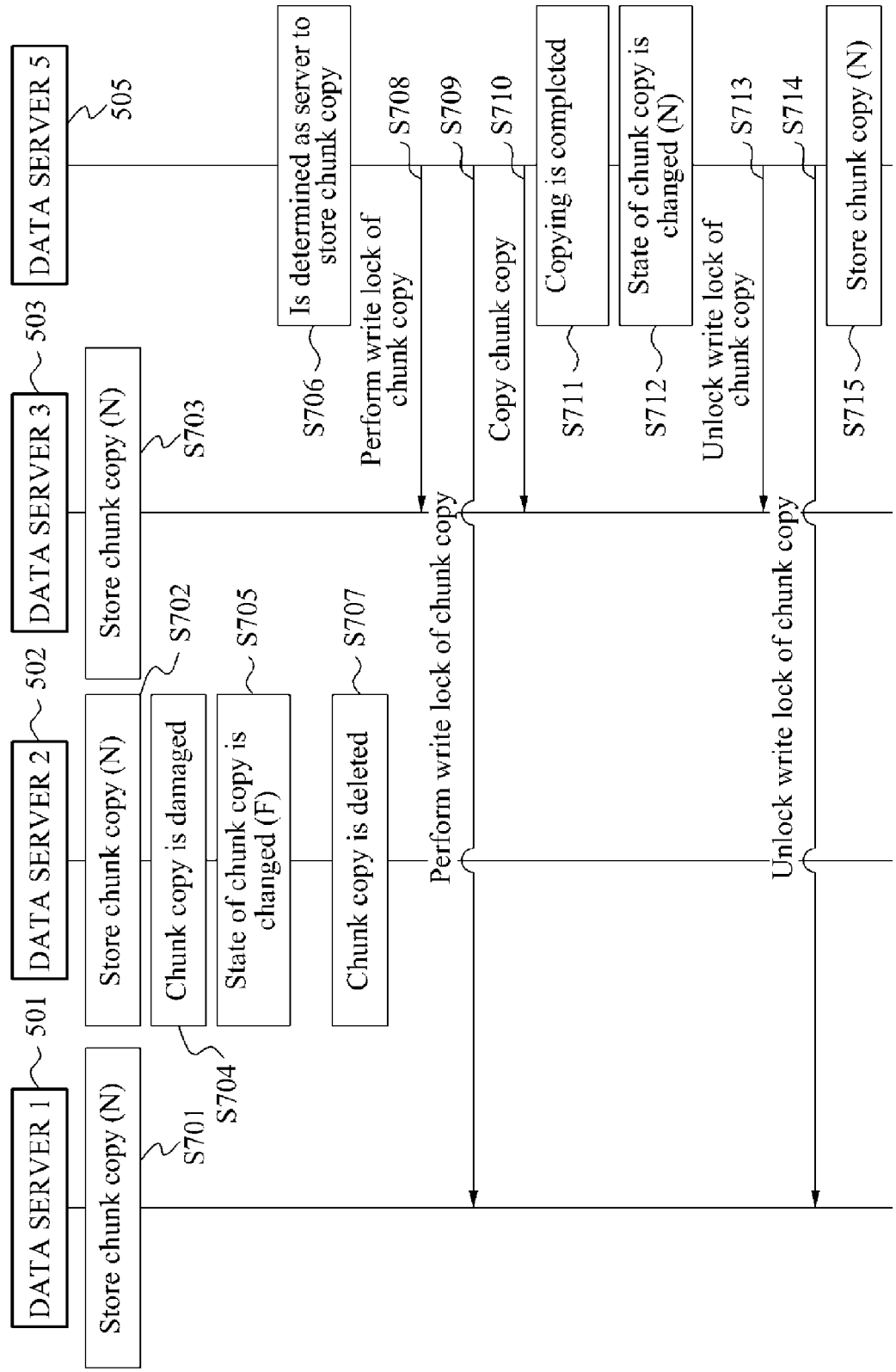

SYSTEM AND METHOD FOR DISTRIBUTED PROCESSING OF FILE VOLUME

CROSS-REFERENCE TO RELATED APPLICATION

This application claims priority from and the benefit of Korean Patent Application No. 10-2010-0094485, filed on Sep. 29, 2010, which is incorporated herein by reference for all purposes as if fully set forth herein.

BACKGROUND OF THE INVENTION

1. Field

This disclosure relates to a system and method for distributed processing of a file volume, and more particularly, to a system and method for generating one or more chunks by dividing a file volume to distribute, store, and to perform an operation related to the generated chunk.

2. Discussion of the Background

A method of configuring a distributed file system using a plurality of servers in order to store a large volume of file data has been suggested. Since the plurality of servers, which may be low in cost, is used for distributed processing of the file data, the distributed file system may exhibit outstanding effectiveness in terms of costs and performance. The servers constituting the distributed file system may include a large-scale virtual storage device.

However, when a low-priced server is used, errors may frequently occur in the file data stored therein. That is, when using the low-priced server, there may be an advantage in that a cost of hardware used for configuring a distributed file system may be reduced. However, there may be a disadvantage in that an operation of the system may be interrupted due to frequent occurrences errors in the stored file data during the usage of the low-priced server.

SUMMARY

Exemplary embodiments of the present invention provide a system and method for performing distributed storage a large file volume.

Additional features of the invention will be set forth in the description which follows, and in part will be apparent from the description, or may be learned by practice of the invention.

Exemplary embodiments of the present invention provide a file processing system including a system targeting unit to target one of at least one distributed file system, a chunk generator to generate a chunk including file blocks by dividing a file volume to be stored in the targeted distributed file system, and a chunk operation requesting unit to request storage of the generated chunk in the targeted distributed file system, and to receive a result of the storage of the chunk.

Exemplary embodiments of the present invention provide a distributed file system including at least one data server, wherein the at least one data server may include a chunk storage unit to store a chunk copy in response to a request to store a chunk, received from a file processing system, generated by dividing a file volume, and a chunk operation performing unit to perform an operation with respect to the chunk copy in response to an operation request for the chunk received from the file processing system, in which the data server may further comprise a chunk copying unit to copy a chunk copy from a second data server an identical copy of a chunk copy stored in a first data server when the chunk copy stored in the first data server is damaged by an error occurring in the first data server.

Exemplary embodiments of the present invention provide a method of storing a file volume, including targeting one of at least one distributed file system, s generating a chunk including file blocks by dividing a file volume to be stored in the targeted distributed file system, and requesting storage of the generated chunk in the targeted distributed file system, and receiving a result of the storage of the chunk.

Exemplary embodiments of the present invention provide a distributed file processing method that may be performed by a distributed file system including at least one data server, wherein at least one data server may perform storing a chunk copy in response to a request to store a chunk, received from a file processing system, generated by dividing a file volume, and performing an operation with respect to the chunk copy in response to an operation request for the chunk received from the file processing system.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 6 is a flowchart illustrating a process of storing a file volume according to an exemplary embodiment of the invention.

FIG. 7 is a flowchart illustrating a process of performing a replica migration operation to regenerate a chunk copy according to an exemplary embodiment is of the invention.

DETAILED DESCRIPTION OF THE ILLUSTRATED EMBODIMENTS

Figure 1:
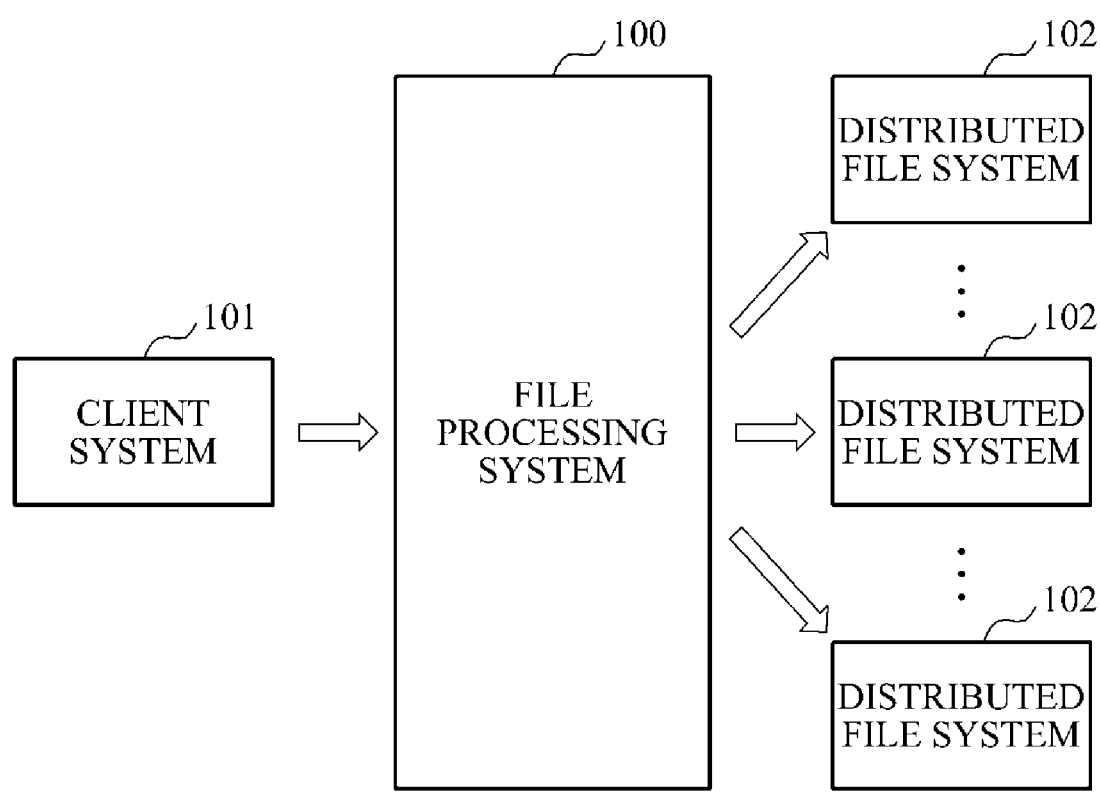
FIG. 1 is a block diagram illustrating a configuration of a file distribution system according to an exemplary embodiment of the invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, s and structures. The relative size and depiction of these elements may be exaggerated for clarity, illustration, and convenience.

FIG. 1 is a block diagram illustrating a configuration of a file distribution system according to an exemplary embodiment of the invention.

As shown in FIG. 1, the system includes a file processing system 100, a client system 101, one or more distributed file systems 102.

The client system 101 may transmit a request to store a file volume or data to a file processing system 100. For example, the client system 101 may request the file processing system 100 to store a file volume with a size of 100-gigabyte (GB). The file processing system 100 may be a disk on a network with a corresponding volume or size is of the file volume (e.g., 100 GB).

The file processing system 100 may divide the file volume into one or more chunks, and may request a distributed file system 102 to store the at least one divided chunk. The distributed file system 102 may store at least one chunk. Further, the distributed file system 102 may generate a reference number of copies of the distributed chunk to store therein. The distributed file system 102 may be connected to the file processing system via a network. The file distribution system may include one or more distributed file systems 102.

The following descriptions will be further described in relation to the file processing system 100 and the distributed file system 102.

Figure 2:
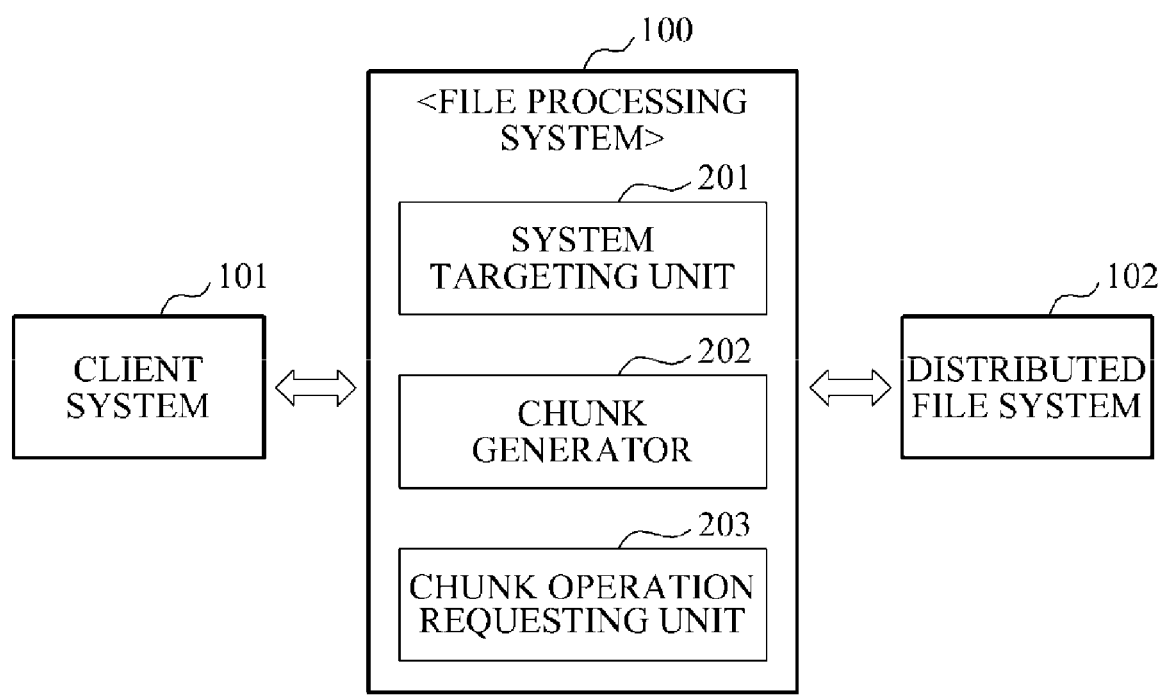
FIG. 2 is a block diagram illustrating a configuration of a file processing system according to an exemplary embodiment of the invention.

FIG. 2 is a block diagram illustrating a configuration of a file processing system according to an exemplary embodiment of the invention.

As shown in FIG. 2, the file processing system 100 includes a system targeting unit 201, a chunk generator 202, and a chunk operation requesting unit 203.

The system targeting unit 201 may target or select at least one distributed file system 102 to distribute one or more chunks of the divided files. For example, the client system 101 may operate an Internet Small Computer System Interface (iSCSI) target emulation of the system targeting unit 201 using an iSCSI initiator module included in an operating system (OS) kernel. The iSCSI target emulation of the system targeting unit 201 may target or select at least one distributed file system 102 that may exist on a network. According to aspects of the invention, the system targeting unit 201 may target or select a distributed file system 102, through which an iSCSI target may be possible, using an Internet Protocol (IP) address.

The chunk generator 202 may generate a chunk, which may include file blocks, by dividing a file volume to be stored in the targeted or selected distributed file system 102. The chunk generator 202 may divide the file volume into chunks of a reference size. That is, a chunk may be generated by dividing the file volume, which may be requested by the client system 101 to be stored, and may include a plurality of file blocks. Further, the chunk generator 202 may generate one or more copies of the chunk for internal storage or distributed storage. The chunk generator 202 may group the generated chunk copies according to ownership information.

The chunk operation requesting unit 203 may request storage of the generated chunk or chunk copies in the targeted or selected distributed file system 102, and may receive a result notification confirming the storage of the chunk or chunk copies. The chunk operation requesting unit 203 may request storage of the generated chunk or chunk copies to one or more data servers in the distributed file system 102. If the s distributed file system 102 responds to the request, the chunk operating requesting unit 203 may transmit the chunk, chunk copies, or chunk copies grouped based on ownership to be stored in the distributed file system 102.

Accordingly, one or more copies of the generated chunks may be stored in the plurality of data servers in the distributed file system 102. Also, the chunk operation requesting unit 203 may request the distributed file system 102 to perform an operation to create a copy of a received chunk, an operation to read the chunk, and an operation to write the chunk.

For example, the distributed file system 102 may include a plurality of data servers, in which the distributed chunk copies may be stored. The distributed file is system 102 may store the chunks copies in response to the request to store the chunk from the chunk operation requesting unit 203. A data server may include a corresponding disk space to store a file volume, and may further include a large capacity virtual storage space. Further, the distributed file system 102 may store the distributed chunk copies in one or more of the plurality of data servers based on owner-based grouping of the chunk copies. According to aspects of the invention, an owner of a divided chunk copy may be determined based on directory information, which may be included in the divided chunk copy stored in a data server. Further, the owner of a divided chunk copy may correspond to the directory information of the divided the chunk copy stored in the data server. Further, the divided chunk copy may be stored based on owner information corresponding to one or more chunk groups. The distributed file system 102 may store distributed chunk copies corresponding to a reference number based on owner information, thereby efficiently storing the file volume.

If a chunk copy is determined to be damaged due to an error occurring in one of the plurality of data servers storing the chunk copies, the distributed file system 102 may perform a replica migration operation to regenerate a corresponding chunk copy using another data server storing an identical copy of the chunk copy. More specifically, the distributed file system 102 may create an identical copy of the undamaged chunk in advance to be stored in a different server, which may be duplicated to replace a damaged chunk copy. According to aspects of the invention, a chunk copy may be determined to be damaged if the chunk copy is deleted, partially lost, changed, unreadable, or the like. A state of the chunk copy may be displayed using a reference indicator.

Figure 3:
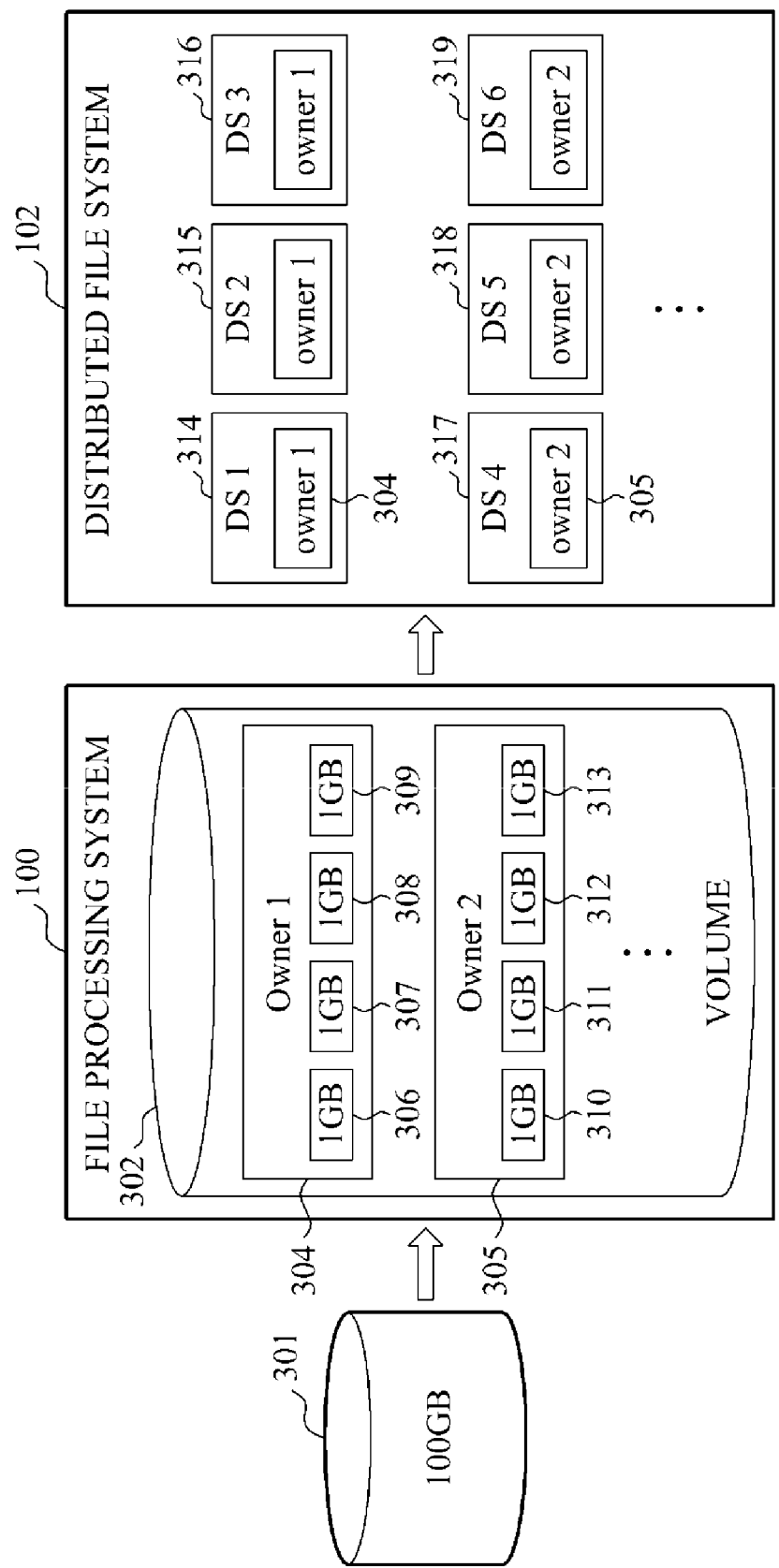
FIG. 3 is a diagram illustrating a file volume being stored according to an exemplary embodiment of the invention.

FIG. 3 is a diagram illustrating a file volume being stored according to an is exemplary embodiment of the invention.

A file processing system 100 may receive a request, from the client system 101 of FIG. 1, to store a file volume 301. The file processing system 100 may divide the file volume 301 into reference sized chunks. As shown in FIG. 3, if the 100-GB file volume 301 is provided, the file processing system 100 may divide the file volume 301 into one hundred chunks including chunks 306 through 313. Here, a single chunk may have a size of 1 GB. Although it is not illustrated, the divided chunks may also be divided into various sizes.

The file processing system 100 may set the generated chunks as volume 302. The distributed file system 102 of FIG. 1 may distribute the chunks to data servers, including data server 314, data server 315, data server 316, data server 317, data server 318, and data server 319, to be stored based on owner-based grouping of the chunks. Referring to FIG. 3, chunks 306, chunk 307, chunk 308 and chunk 309 may correspond to a single owner, such as, an owner 1 304. Also, chunk 310, chunk 311, chunk 312, and chunk 313 may constitute a different owner, such as, an owner 2 305.

Chunk copies may be distributed and stored in the data servers. Referring to FIG. 3, multiple chunk copies may be generated and stored in the data servers based on owner-based grouping. More specifically, chunk 306, chunk 307, chunk 308, chunk 309 and their copies may correspond to the owner 1 304, and may be distributed and stored respectively in a data server (DS) 1 314, a DS 2 315, and a DS 3 316. Further, chunk 310, chunk 311, chunk 312, chunk 313 and their copies may correspond to the owner 2 305, and may be distributed and stored along with their copies respectively in a DS 4 317, a DS 5318, and a DS 6319.

If the file processing system 100 requests the distributed file system 102 to read one of the copies of chunk 306, the DS 1 314, the DS 2 315, and/or the DS 3 316 may perform the operation to read the chunk 306. If the file processing system 100 requests an operation to create a chunk, or an operation to write the chunk, one or more servers of a group of three data servers associated with the chunk copies may perform the operation. That is, the chunk copies may be generated, distributed and stored to have the same content in one or more servers of the group. Accordingly, one or more of the associated data servers may participate in the creation or the writing operation of the chunk copies.

Although not shown in FIG. 3, the distributed file system 102 may further include a metadata server. The metadata server may store location information of a data server, in which a chunk copy corresponding to an owner unit may be stored. The file processing system 100 may verify, from the metadata server, the information regarding s the location information of the chunk copy, and may request a corresponding data server to perform an operation. Here, in the corresponding data server, the target chunk copy to be processed may be stored.

Although an example of three chunk copies being generated has been described with reference to FIG. 3, the number of the chunk copies may be varied based on a configuration of the system. Additionally, the owner may also be set to be a subset of the volume 302 based on a configuration of the system.

Figure 4:
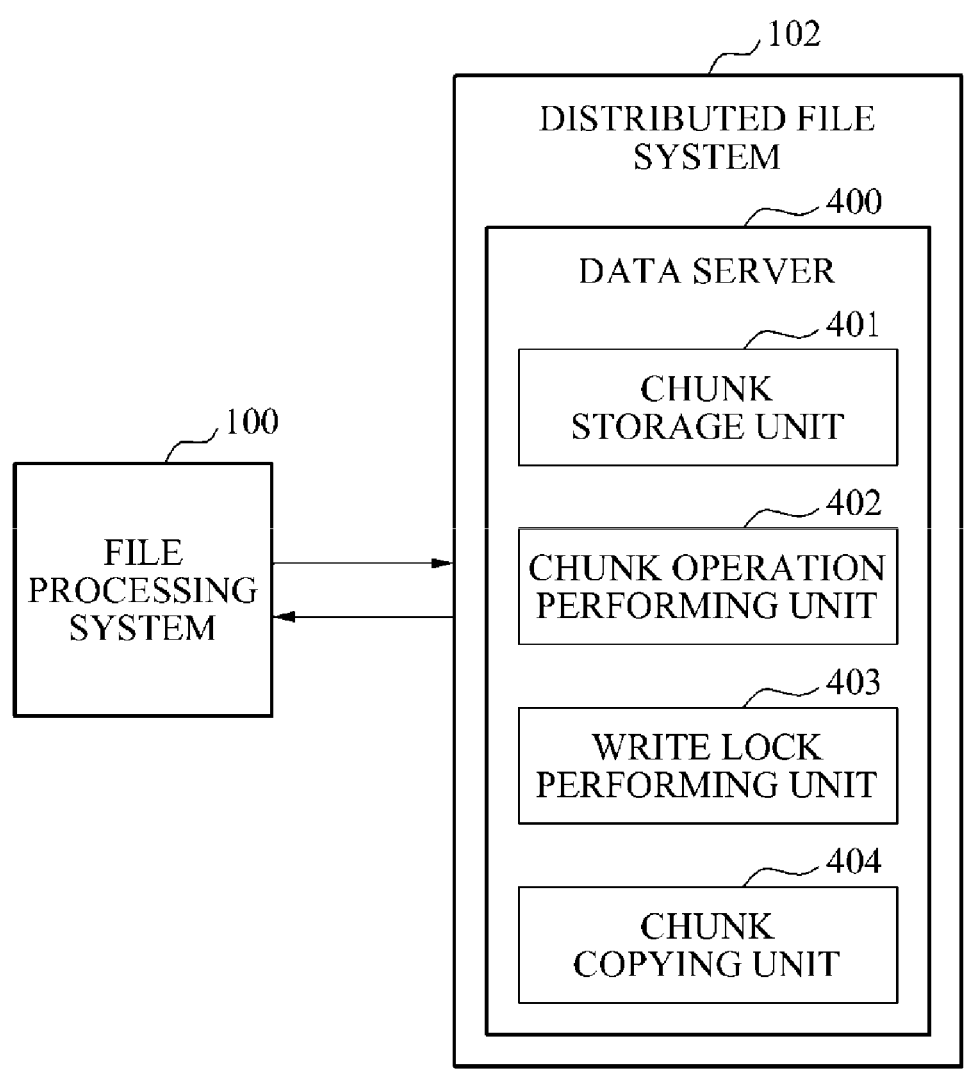
FIG. 4 is a block diagram illustrating a configuration of a distributed file system according to an exemplary embodiment of the invention.

FIG. 4 is a block diagram illustrating a configuration of a distributed file system according to an exemplary embodiment of the invention.

Referring to FIG. 4, the distributed file system 102 may include a data is server 400. Although not illustrated for sake of simplicity, the distributed file system 102 may include one or more data servers. As shown in FIG. 4, the data server 400 includes a chunk storage unit 401, a chunk operation performing unit 402, a write lock performing unit 403, and a chunk copying unit 404.

The chunk storage unit 401 may store a chunk copy in response to a request to store the chunk, which may be received from a file processing system 100.

The chunk transmitted by the file processing system 100 may be generated by dividing a file volume.

According to aspects of the invention, the chunk may be generated by dividing the file volume by a reference size or sizes, and may include a plurality of file blocks. The data server 400 may store at least one chunk copy using the chunk storage unit 401. Further, the chunk storage unit 401 may store chunk copies based on owner-based grouping of the chunk copies. A single owner may correspond to at least one chunk copy.

The chunk operation performing unit 402 may perform an operation with respect to the chunk copy in response to an operation request received from the file processing system 100. The file processing system 100 may request the distributed file system 102 to perform an operation to create a chunk, an operation to write the chunk, and/or an operation to read the chunk.

If an error occurs in one of data servers constituting the distributed file system 102, a chunk copy stored in the corresponding data server may be damaged or lost. Chunk copies corresponding to an original undamaged chunk may be stored in different data servers, and accordingly, the damaged or lost chunk copy may be restored using the undamaged chunk copies. More specifically, the distributed file system 102 may restore the chunk copy by performing a replica migration operation to regenerate, in another data server, the chunk copy damaged or lost by the error occurring in the data server. Accordingly, the distributed file system 102 may use an identical or similar copy of the undamaged chunk copy stored in a different data server to replace the damaged or lost chunk.

If a chunk copy stored in a first data server is damaged by an error of the first data server, an undamaged chunk copy may be copied from a second data server, in which an identical or similar copy of the corresponding undamaged chunk copy may be stored. The chunk copy may be determined to be damaged if the chunk copy is deleted, partially lost, changed, unreadable, or the like. A state of the chunk copy may be classified into a normal (N) state, a failure (F) state, and a migration (M) state. In particular, the N state may refer to a state in which a chunk copy is determined to be normal, where a reading operation and a writing operation may be performable. The F state may refer to a state in which a chunk copy may be damaged, where a reading operation or a writing operation may not be performed normally. Also, the M state may refer to a state in which a replica migration operation may be performed to regenerate a chunk copy, where a reading operation may not be performed normally, but a writing operation may be performable.

Figure 5:
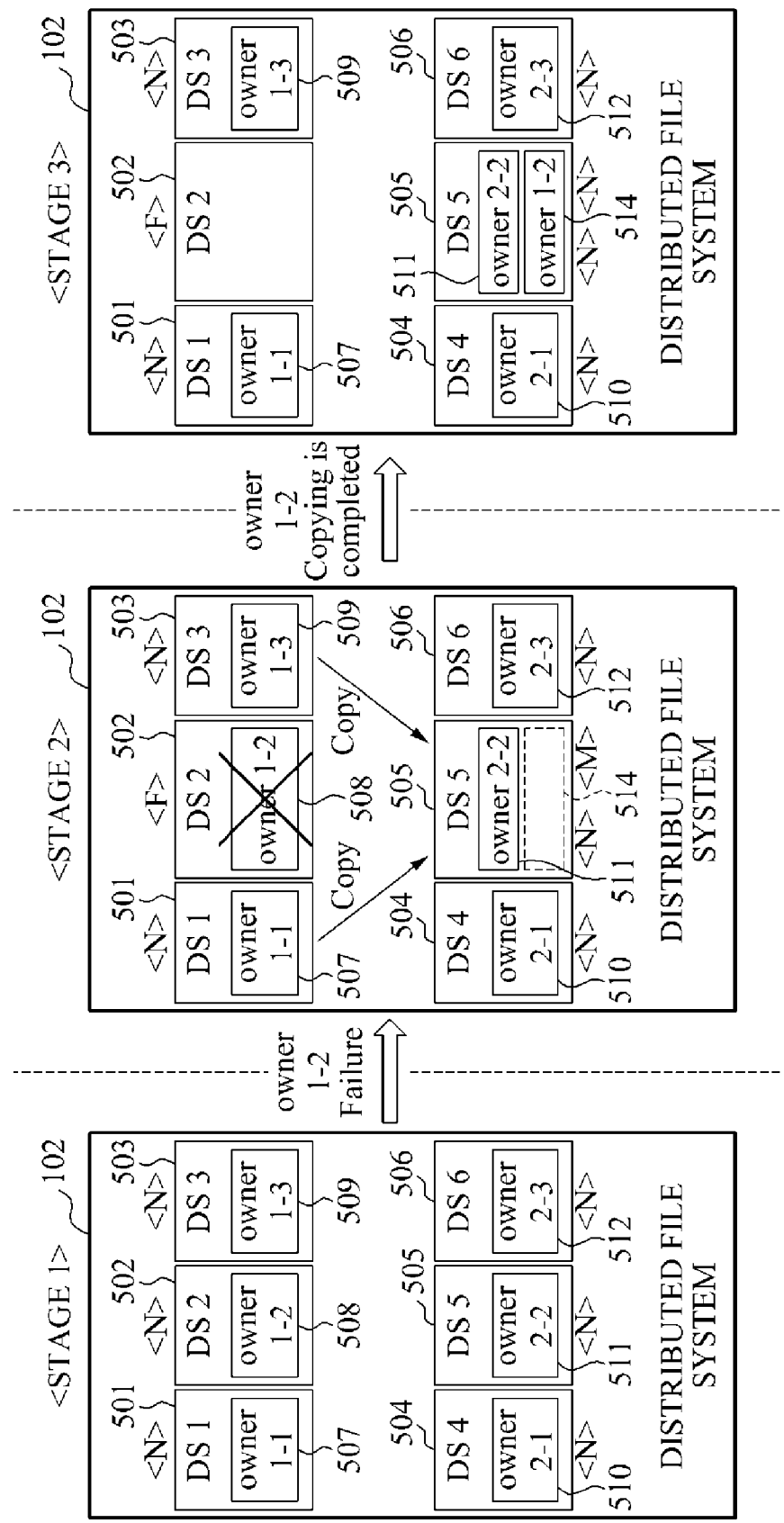
FIG. 5 is a diagram illustrating a system performing a regeneration of a replica chunk copy according to an exemplary embodiment of the invention.

A process of performing the replica migration operation to regenerate the chunk copy will be further described with respect to FIG. 5.

The write lock performing unit 403 may perform a write lock on the chunk copy stored in the second data server based on a copy processing of the damaged chunk copy. If a content of the chunk copy is changed in the copying process of the chunk copy by the chunk copying unit 404, the chunk copy may be re-copied.

Accordingly, the write lock performing unit 403 may perform the write lock on the chunk copy stored in the second data server based on the copy processing of the damaged chunk copy. The write lock performing unit 403 may delay an operation by performing the write lock on an identical or similar copy of the chunk copy selected to be copied, before the chunk copying unit 404 performs the copying. If the chunk copying unit 404 completes the copying of the chunk copy, the write lock performing unit 404 may unlock the write lock on the chunk copy.

FIG. 5 is a diagram illustrating a system performing a regeneration of a replica chunk copy according to an exemplary embodiment of the invention.

Referring to FIG. 5, Stage 1 illustrates chunk copy 507, chunk copy 508, chunk copy 509, chunk copy 510, chunk copy 511, and chunk copy 512 respectively s stored in data server (DS)1 501, DS2 502, DS3 503, DS4 504, DS5 505, and DS6 506 of a distributed file system 102. The chunk copies may be grouped based on ownership information and may be in an N state. Further, chunk copy 507, chunk copy 508, and chunk copy 509 may correspond to owner 1-1, 1-2, and 1-3 respectively. Chunk copy 510, chunk copy 511, and chunk copy 512 may correspond to owner 2-1, 2-2, and 2-3 respectively.

Stage 2 illustrates that a chunk copy 508 stored in the DS 2 502 may be damaged or lost in the DS 2 502. In this instance, a state of the chunk copy 508 corresponding to an owner 1-2 included in the DS 2 502 is changed into an F state.

The distributed file system 102 may perform a replica migration operation to regenerate or restore the damaged or lost chunk copy 508. More specifically, DS 1 501 and/or DS 3 503, which may store an identical or similar chunk copy of 508 (e.g., chunk copy 507 and chunk copy 509), may provide a replacement or regenerated copy for the damaged or lost chunk copy. Further, the distributed file system 102 may determine a new data server to store the regenerated version of the chunk copy 508 (e.g., chunk copy 514). Referring to FIG. 5, the distributed file system 102 may determine the DS 5 505 to be the new data server to store the regenerated version of chunk copy 508(e.g., chunk copy 514). In addition, the distributed file system 102 may determine or select a data server, in which a chunk copy may be not stored therein, to be the new data server to store the regenerated version of chunk copy 508.

Referring to stage 2 of FIG. 5, if the new data server is selected or determined to store a regenerated version of the chunk copy 508, a state of the regenerated version of chunk copy 508 (e.g., chunk copy 514) may be changed into an M s state. Since copying process of the chunk copy 514 is yet to be performed in this stage, the chunk copy 514 may be absent in the DS 5 505.

The DS 5 505 may receive the chunk copy 507 and/or the chunk copy 509 from one or both of the DS 1 501 or the DS 3 503.

In this instance, if copying the chunk copy, the DS 5 505 may perform the following operation in order to prevent a change of the chunk copy during the copying operation. For example, the DS 5 505 may perform a write lock operation on the chunk copy 507 stored in the DS 1 501 and/or the chunk copy 509 stored in the DS 3 503 before copying the chunk copy 507 and/or chunk copy 509. In this instance, the DS 5 505 may transfer a message respectively to the DS 1 501 and the DS 3 503, and may request to is delay a writing operation if a request for the writing operation with respect to the chunk copy 507 and chunk copy 509 is received.

If the DS 5 505 completes copying the chunk copy 507 or the chunk copy 509, the DS 5 505 may unlock the write lock on the chunk copy 507 stored in the DS 1 501 and the chunk copy 509 stored in the DS 3 503. In this instance, the DS 5 505 may transfer a message to request to unlock the write lock respectively to the DS 1 501 and the DS 3 503. In response, the DS 1 501, the DS 3 503, and the DS 5 505 may perform the writing operation with respect to the chunk copy 507, chunk copy 509, and chunk copy 514, respectively.

If an operation to write the chunk copy is requested with respect to the chunk copy 514 that may be regenerated in the DS 5 505, the DS 5 505 may perform processing as described in the following. If a chunk copy requested in the writing operation is stored in the DS 5 505, the corresponding chunk may be copied. In this s instance, the DS 5 505 may perform the identical or similar writing operation that may be performed on a copy in an N state, and may respond by transmitting a result of the operation. The DS 5 505 may respond by indicating the writing operation on the corresponding chunk to be a success. More specifically, if the corresponding chunk is copied, a chunk on which the writing operation is performed may be copied through synchronization performed between data servers, in which the identical or similar chunk copies may be stored. If a chunk requested in the writing operation is not stored in the DS 5 505, the corresponding chunk may not be copied.

If an error occurs in the DS 5 505 during a process of copying and regenerating the chunk copy, an M state of the chunk copy 514 in the regeneration is process may be changed to an F state. In this instance, a state of the chunk copy 514 in the copying process may be converted from an M state to the F state. The DS 5 505 may perform a replica migration operation to regenerate the chunk copy 514 by initially copying the chunk copy 507 and/or the chunk copy 509 from one or both of the DS 1 501 and the DS 3 503.

Stage 3 illustrates a state after completion of the regeneration process with respect to the chunk copy 508. In this instance, a state of the chunk copy 514, which may be an identical or similar copy of chunk 508, stored in the DS 5 505 may correspond to the N state.

FIG. 6 is a flowchart illustrating a process of storing a file volume according to an exemplary embodiment of the invention.

In operation S601, a client system 101 may request a file processing system 100 to store a file volume. In operation S602, the file processing system 100 may s target or select a distributed file system 102 to store the file volume, among a plurality of distributed file systems. In operation S603, the file processing system 100 may divide the file volume requested, by the client system 101, to be stored into a plurality of chunks of one or more reference sizes. In operation S604, the file processing system may request the targeted or selected distributed file system 102 to store the plurality of chunks based on owner-based grouping of the chunks. In operation S605, the distributed file system 102 may perform distributed storage of chunk copies in a plurality of data servers. In operation S606, the distributed file system 102 may respond by transmitting a result of the storage in relation to the plurality of chunks to the file processing system 100.

In operation S607, the file processing system 100 may request an is operation for a chunk (e.g., write, read). In operation S 608, the distributed file system 102 may perform one or more operations for chunks that may be distributed and stored in the plurality of data servers. In this instance, the distributed file system 102 may perform one or more operations with respect to chunk copies in relation to the requested chunk. If an operation is performed with respect to the chunk, the distributed file system 102 may respond by transmitting a result of the operation with respect to the chunk to the file processing system 100 in operation S609.

FIG. 7 is a flowchart illustrating a process of performing a replica migration operation to regenerate a chunk copy according to an exemplary embodiment of the invention.

In particular, FIG. 7 illustrates the process of performing the replica migration operation to regenerate the chunk copy using the DS 1 501, the DS 3 503, and the DS 5 505 if a chunk copy stored in the DS 2 502 is damaged.

The DS 1 501, the DS 2 502, and the DS 3 503 may store chunk copies including the same or similar content, respectively in operations S701, S702, and S703. In this instance, a state of each of the chunk copies may be in an N state.

If the chunk copy is damaged by an error occurring in the DS 2 502 in operation S704, a state of the chunk copy may be changed from the N state to an F state in operation S705. In operation S706, the distributed file system 102 may determine or identify the DS 5 505 as a server to store the regenerated chunk copy may be stored. In this instance, a state of the damaged chunk copy may be changed from the F state to an M state. Also, in operation S707, the damaged or lost chunk copy may be deleted.

The DS 5 505 may request the DS 1 501, in which an identical or similar is copy of the deleted chunk copy is stored, to perform a write lock on the chunk copy in operation S708. Also, the DS 5 505 may request the DS 3 503, in which an identical or similar copy of the deleted chunk copy is stored, to perform a write lock on the chunk copy in operation S709. If the write lock is performed, the DS 5 505 may copy a chunk copy in the N state from the DS 3 503, in operation S710. Similarly, the DS 5 505 may copy a chunk copy from the DS 1 501.

If the copying of the chunk copy is completed in operation S711, a state of the regenerated chunk copy in the DS 5 505 may be changed from the M state to the N state in operation S712. The DS 5 505 may request the DS 1 501 and the DS 3 503 to unlock the write lock on the chunk copy, respectively in operations S713 and S714. In operation S715, the DS 5 505 may store the regenerated chunk copy.

Descriptions of FIG. 1, FIG. 2, FIG. 3, FIG. 4, and FIG. 5 may be referred to in relation to a description which has been omitted with reference to FIG. 6 and FIG. 7 for conciseness.

According to exemplary embodiments of the present invention, a large file volume may be efficiently stored in one or more low-priced servers, by dividing a large file volume into chunks of a reference size or sizes, and performing distributed storage of the chunks in a distributed file system based on owner-based grouping of the chunks.

According to exemplary embodiments of the present invention, a file processing capability may be improved by performing distributed storage of chunk copies including the same or similar content in a data server, the chunk copies corresponding to a reference number, and by performing a copying or regenerating operation with respect to another chunk copy if a chunk copy is damaged.

According to exemplary embodiments of the present invention, a chunk copy may be restored by copying a recently updated copy stored in a different data server, without logging a change operation with respect to a chunk file if the chunk copy is damaged or lost.

The file volume storing method and the distributed file processing method according to exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM discs and DVD; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

It will be apparent to those skilled in the art that various modifications and variation can be made in the present invention without departing from the spirit or scope is of the invention. Thus, it is intended that the present invention cover the modifications and variations of this invention provided they come within the scope of the appended claims and their equivalents.

What is claimed is:

1. A file processing system, comprising:
a processor configured to,
 select a distributed file system, the distributed file system includes a plurality of data servers in which chunk copies are distributed and stored, the distributed file system forming a large-scale virtual storage device such that the plurality of data servers appear as a single storage device to a client system connected thereto;
 generate a chunk by dividing a file volume to be stored in the distributed file system; and
 request storage of the chunk in the distributed file system, the chunk being stored based on an ownership of the chunk, and wherein
the distributed file system is configured to,
 store, on a first data server of the plurality of data servers, the chunk in response to the request to store the chunk from file processing system,
 determine if the chunk is damaged,
 perform a replica migration operation to generate an undamaged chunk copy of the chunk if the chunk is damaged, the replica mitigation operation generating the undamaged chunk copy by,
  selecting, one of the plurality of data servers not having a copy of the chunk as a new data server, the new data server being a different data server from the first data server, and
  copying an undamaged chunk copy from a second data server of the plurality of data servers storing an undamaged chunk copy to the new data server, the undamaged chunk copy that is copied from the second data server to the new data server being an undamaged identical version of the chunk stored in the first data server, the first data server and the second data server storing chunk copies having a different owner.

2. The file processing system of claim 1, wherein the distributed file system is configured to:
perform distributed storage of the chunk copies in each of the plurality of data servers, based on an ownership grouping of the chunk copies.

3. The file processing system of claim 1, wherein the processor is configured to:
select a distributed file system on which an Internet Small Computer System Interface (iSCSI) target is possible, using an Internet Protocol (IP) address.

4. A distributed file system comprising:
a plurality of data servers forming a large-scale virtual storage device such that the plurality of data servers appear as a single storage device to a client system connected thereto, each of the plurality of data servers including a processor configured to,
 store, on a first data server of the plurality of data servers, a chunk in response to a request to store the chunk, the chunk being received from a file processing system, generated by dividing a file volume, and stored based on an ownership of the chunk, perform an operation with respect to the chunk in response to an operation request for the chunk received from the file processing system, determine if the chunk stored in the first data server is damaged, and perform a replica migration operation to generate an undamaged chunk copy of the chunk if the chunk is damaged, the replica mitigation operation generating the undamaged chunk copy by, selecting, one of the plurality of data servers not having a copy of the chunk as a new data server, the new data server being a different data server from the first data server, and copying the undamaged chunk copy from a second data server of the plurality of data servers storing the undamaged chunk copy to the new data server, the undamaged chunk copy that is copied from the second data server to the new data server being an identical undamaged copy of the chunk stored in the first data server, the first data server and the second data server storing chunk copies having a different owner.

5. The distributed file system of claim 4, wherein during the replica migration operation, the second data server transmits the identical undamaged chunk copy to the new data server.

6. The distributed file system of claim 4, wherein the processor is further configured to perform a write lock on the chunk stored in the second data server, based on a copying operation of the chunk.

7. The distributed file system of claim 6, wherein the processor is further configured to:

perform the write lock operation before copying the chunk from the second data server, and unlock the write lock placed on the chunk copy stored in the second data server in response to completion of the copying operation.

8. A method for storing a file volume, the method comprising:

selecting a distributed file system, the distributed file system including a plurality of data servers in which chunk copies are distributed and stored, the distributed file system forming a large-scale virtual storage device such that the plurality of data servers appear as a single storage device to a client system connected thereto;

generating a chunk by dividing a file volume to be stored in the distributed file system; and requesting storage of the chunk in the distributed file system, the chunks being grouped and stored based on an ownership of the chunks, and wherein the distributed file system is configured to, store, on a first data server of the plurality of data servers, the chunk in response to the request to store the chunk from file processing system, determine if the chunk is damaged, and perform a replica migration operation to generate an undamaged chunk copy of the chunk if the chunk is damaged, the replica mitigation operation generating the undamaged chunk copy by, selecting, one of the plurality of data servers not having a copy of the chunk as a new data server, the new data server being a different data server from the first data server, and copying an undamaged chunk copy from second data server of the plurality of data servers storing an undamaged chunk copy to the new data server, the undamaged chunk copy being an undamaged identical version of the chunk stored in the first data server, the first data server and the second data server storing chunk copies having a different owner.

9. The method of claim 8, further comprising:
distributing and storing chunk copies in the distributed file system.

10. The method of claim 8, wherein chunk copies in each of the plurality of data servers are stored based on an ownership grouping of the chunk copies.

11. The method of claim 8, wherein the selecting a distributed file system comprises:
selecting the distributed file system on which an Internet Small Computer System Interface (iSCSI) target is possible, using an Internet Protocol (IP) address.

12. A distributed file processing method that is performed by a distributed file system, the method comprising:

storing a chunk on a first data server of a plurality of data servers included in the distributed file system in response to a request to store the chunk, the chunk being received from a file processing system, generated by dividing a file volume, and stored based on an ownership of the chunk, the plurality of data servers forming a large-scale virtual storage device such that the plurality of data servers appear as a single storage device to a client system connected thereto;

performing an operation with respect to the chunk in response to an operation request for the chunk received from the file processing system;

determine if the chunk stored in the first data server is damaged; and perform a replica migration operation to generate an undamaged chunk copy of the chunk if the chunk is damaged, the replica mitigation operation generating the undamaged chunk copy by, selecting, one of the plurality of data servers not having a copy of the chunk as a new data server, the new data server being a different data server from the first data server, and copying the undamaged chunk copy from a second data server of the plurality of data servers storing the undamaged chunk copy to the new data server, the undamaged chunk copy that is copied from the second data server to the new data server being an identical undamaged copy of the chunk stored in the first data server, the first data server and the second data server storing chunk copies having a different owner.

13. The method of claim 12, wherein
during the replica migration operation, the second data server transmits the identical undamaged chunk copy to the new data server.

14. The method of claim 13, further comprising:
performing a write lock operation on the chunk stored in the second data server, based on a copying operation of the chunk.

15. The method of claim 14, wherein the performing of the write lock operation comprises:
performing the write lock operation before copying the chunk from the second data server, and unlocking the write lock placed on the chunk stored in the second data server in response to completion of the copying operation.

* * * * *